United States Patent
Nagasaka et al.

(10) Patent No.: US 10,531,386 B2
(45) Date of Patent: Jan. 7, 2020

(54) BASE STATION, APPARATUS AND COMMUNICATION METHOD FOR RETRANSMITTING PAGING MESSAGE ADDRESSED TO RADIO TERMINAL

(71) Applicant: KYOCERA CORPORATION, Kyoto (JP)

(72) Inventors: Yushi Nagasaka, Ritto (JP); Shingo Katagiri, Yokohama (JP); Masato Fujishiro, Yokohama (JP); Kugo Morita, Higashiomi (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 15 days.

(21) Appl. No.: 15/693,652

(22) Filed: Sep. 1, 2017

(65) Prior Publication Data
US 2017/0367050 A1  Dec. 21, 2017

Related U.S. Application Data

(63) Continuation of application No. PCT/JP2016/056438, filed on Mar. 2, 2016.

(30) Foreign Application Priority Data

Mar. 3, 2015 (JP) ................................. 2015-041866

(51) Int. Cl.
*H04W 52/02* (2009.01)
*H04W 68/02* (2009.01)
(Continued)

(52) U.S. Cl.
CPC ....... *H04W 52/0229* (2013.01); *H04W 52/02* (2013.01); *H04W 68/005* (2013.01);
(Continued)

(58) Field of Classification Search
CPC ............ H04W 52/0229; H04W 76/28; H04W 68/005; H04W 72/042; H04W 68/02;
(Continued)

(56) References Cited

U.S. PATENT DOCUMENTS

2012/0300685 A1* 11/2012 Kim ..................... H04W 68/02
370/311
2013/0107721 A1  5/2013 Wang et al.
(Continued)

FOREIGN PATENT DOCUMENTS

JP  2014-534731 A  12/2014
WO  2013/149666 A1  10/2013
(Continued)

OTHER PUBLICATIONS

An Office Action issued by the Japanese Patent Office dated Oct. 3, 2017, which corresponds to Japanese Patent Application No. 2017-503689 and is related to U.S. Appl. No. 15/693,652; with English language concise explanation.
(Continued)

*Primary Examiner* — Feben Haile
(74) *Attorney, Agent, or Firm* — Studebaker & Brackett PC (57) ABSTRACT

A base station according to one embodiment comprises a transmitter configured to transmit a downlink control channel for a radio terminal to receive, in an idle mode, a paging message; and a controller configured to retransmit a paging message addressed to the radio terminal, if an extended DRX using a second DRX cycle longer than a first DRX cycle is configured to the radio terminal.

5 Claims, 5 Drawing Sheets

(51) Int. Cl.
   *H04W 68/00* (2009.01)
   *H04W 72/04* (2009.01)
   *H04W 76/28* (2018.01)

(52) U.S. Cl.
   CPC ......... *H04W 68/02* (2013.01); *H04W 72/042* (2013.01); *H04W 76/28* (2018.02); *H04W 52/0216* (2013.01); *Y02D 70/00* (2018.01); *Y02D 70/126* (2018.01); *Y02D 70/1262* (2018.01); *Y02D 70/164* (2018.01); *Y02D 70/21* (2018.01); *Y02D 70/24* (2018.01)

(58) Field of Classification Search
   CPC .. H04W 52/02; H04W 52/0216; H04W 52/00
   See application file for complete search history.

(56) References Cited

U.S. PATENT DOCUMENTS

| | | |
|---|---|---|
| 2013/0136072 A1 | 5/2013 | Bachmann et al. |
| 2016/0044578 A1* | 2/2016 | Vajapeyam ....... H04W 52/0216 370/252 |
| 2016/0044632 A1 | 2/2016 | Liang et al. |

FOREIGN PATENT DOCUMENTS

| | | |
|---|---|---|
| WO | 2014/161472 A1 | 10/2014 |
| WO | 2014/185538 A1 | 11/2014 |

OTHER PUBLICATIONS

The extended European search report issued by the European Patent Office dated Jan. 11, 2018, which corresponds to European Patent Application No. 16758965.4-1219 and is related to U.S. Appl. No. 15/693,652.

Catt, "Text proposal to TR37.869 on extended DRX cycle in idle mode", 3GPP TSG-RAN WG2 Meeting #83, R2-132497; Barcelona, Spain; Aug. 19-23, 2013; 5 pages.

International Search Report issued in PCT/JP2016/056438; dated May 24, 2016.

Qualcomm Incorporated; "New WI Proposal: RAN Enhancements for Extended DRX in LTE"; 3GPP TSG RAN Meeting #66; RP-141994; Dec. 8-11, 2014; pp. 1-6; Maui, Hawaii, USA.

* cited by examiner

BASE STATION, APPARATUS AND COMMUNICATION METHOD FOR RETRANSMITTING PAGING MESSAGE ADDRESSED TO RADIO TERMINAL

RELATED APPLICATIONS

This application is a continuation application of international application PCT/JP2016/056438 (filed Mar. 2, 2016), which claims benefit of Japanese Patent Application No. 2015-041866 (filed on Mar. 3, 2015), the entirety of all applications hereby expressly incorporated by reference.

TECHNICAL FIELD

The present application relates to a base station, an apparatus and a communication method.

BACKGROUND ART

In 3GPP (3rd Generation Partnership Project), which is a project aiming to standardize a mobile communication system, a discontinuous reception (DRX) is prescribed as a discontinuous reception technique to reduce power consumption of a radio terminal. A radio terminal executing a DRX operation in an idle mode discontinuously monitors a downlink control channel for receiving a paging message. A cycle for monitoring the downlink control channel is referred to as "DRX cycle".

In recent years, machine-type communication (MTC) in which a radio terminal performs communication without human intervention in a mobile communication system has attracted attention. From such a background, an ongoing discussion is a new introduction of an extended DRX cycle longer than a conventional DRX cycle to further reduce power consumption (for example, see Non Patent Document 1). The DRX using the extended DRX cycle is referred to as "extended DRX".

PRIOR ART DOCUMENT

Non-Patent Document

Non Patent Document 1; 3GPP contribution "RP-141994"

SUMMARY

A base station according to a first aspect comprises a transmitter configured to transmit a downlink control channel for a radio terminal to receive, in an idle mode, a paging message; and a controller configured to retransmit a paging message addressed to the radio terminal, if an extended DRX using a second DRX cycle longer than a first DRX cycle is configured to the radio terminal.

An apparatus according to a second aspect is provided in a base station. The apparatus comprises a processor and a memory communicatively coupled to the processor, the processor configured to execute the processes of; transmitting a downlink control channel for a radio terminal to receive, in an idle mode, a paging message; and retransmitting a paging message addressed to the radio terminal, if an extended DRX using a second DRX cycle longer than a first DRX cycle is configured to the radio terminal.

A communication method according to a third aspect comprises transmitting, by a base station, a downlink control channel for a radio terminal to receive, in an idle mode, a paging message; and retransmitting, by the base station, a paging message addressed to the radio terminal, if an extended DRX using a second DRX cycle longer than a first DRX cycle is configured to the radio terminal.

DESCRIPTION OF THE EMBODIMENT

Overview of Embodiment

A case is assumed in which a radio terminal executing an extended DRX operation in an idle mode executes, along with the movement thereof, a cell reselection procedure to exist in a second cell from a first cell.

The transmission timing of a downlink control channel is different for each cell, and thus, at the monitoring timing of a downlink control channel by the radio terminal, even if a downlink control channel is transmitted from the first cell, it is possible that a downlink control channel is not transmitted from the second cell. In this case, if the radio terminal has existed in the second cell from the first cell immediately before the monitoring timing of the downlink control channel, the radio terminal does not monitor the downlink control channel until the next monitoring timing, and thus, it is likely that an occasion for obtaining a paging message is delayed by the time of the extended DRX cycle.

Therefore, an embodiment provides a radio terminal and a base station capable of reducing a possibility that the paging message cannot be obtained for a long period as a result of the cell reselection procedure.

A radio terminal according to a first embodiment exists in a predetermined cell. The radio terminal comprises a controller configured to discontinuously monitor, in an idle mode, a downlink control channel for receiving a paging message. The controller monitors the downlink control channel at a common timing. The common timing is a timing at which each base station that manages each cell belonging to a tracking area to which the predetermined cell belongs simultaneously transmits the downlink control channel.

In the first embodiment, the controller monitors the downlink control channel at the common timing if the radio terminal executes an extended DRX operation using a second DRX cycle longer than a first DRX cycle that is a cycle for monitoring the downlink control channel in the idle mode.

The radio terminal according to the first embodiment further comprises a receiver configured to receive, from the predetermined cell, common timing information on a system frame number corresponding to the common timing in the predetermined cell. The controller monitors the downlink control channel at the common timing, based on the common timing information.

A base station according to the first embodiment manages a predetermined cell. The base station comprises a transmitter configured to transmit at a common timing a downlink control channel for a radio terminal to receive, in an idle mode, a paging message. The common timing is a timing at which each base station that manages each cell belonging to a tracking area to which the predetermined cell belongs simultaneously transmits the downlink control channel.

A radio terminal according to a second embodiment comprises a controller configured to discontinuously monitor, in an idle mode, a downlink control channel for receiving a paging message. The controller configures an extended DRX using a second DRX cycle longer than a first DRX cycle that is a cycle for monitoring the downlink control channel. The controller starts a procedure for obtaining the paging message if a predetermined condition is satisfied.

In the second embodiment, the controller stops a power supply to any part other than a function necessary for the radio terminal to be activated, if the second DRX cycle exceeds a threshold value. The controller resumes the power supply and starts the procedure if a timer shorter than the second DRX cycle expires.

The case where the timer shorter than the second DRX cycle expires corresponds to the case where the predetermined condition is satisfied.

In the second embodiment, the controller starts the procedure if a cell in which to exist before the power supply is stopped is different from a cell in which to exist after the power supply is resumed.

The case where a cell in which to exist before the power supply is stopped is different from a cell in which to exist after the power supply is resumed corresponds to the case where the predetermined condition is satisfied.

A base station according to a third embodiment comprises a transmitter configured to transmit a downlink control channel for a radio terminal to receive, in an idle mode, a paging message; and a controller configured to retransmit a paging message addressed to the radio terminal, if an extended DRX using a second DRX cycle longer than a first DRX cycle is configured to the radio terminal.

In the third embodiment, the controller does not retransmit the paging message addressed to the radio terminal, if a DRX using the first DRX cycle is configured to the radio terminal.

In the third embodiment, the controller determines, if receiving the paging message from an upper node, whether or not the extended DRX is configured to a radio terminal to which the paging message is addressed.

In the third embodiment, the base station further comprises a receiver configured to receive, from an upper node, information indicating whether or not the extended DRX is configured to a radio terminal to which the paging message is addressed, together with the paging message.

A radio terminal according to a fourth embodiment comprises a controller configured to discontinuously monitor, in an idle mode, a downlink control channel for receiving a paging message. The controller obtains, from a predetermined cell in which the radio terminal exists, configuration information of an extended DRX using a second DRX cycle longer than a first DRX cycle that is a cycle for monitoring the downlink control channel, and performs, based on the configuration information of the extended DRX, configuration of the extended DRX. The controller obtains, upon selecting a new cell by a cell reselection procedure, configuration information of an extended DRX from the new cell, and performs reconfiguration of the extended DRX, based on the configuration information of the extended DRX.

In the fourth embodiment, the controller discards, after starting the cell reselection procedure, the configuration information of the extended DRX obtained from the predetermined cell.

First Embodiment

Hereinafter, embodiments when the present disclosure is applied to an LTE system will be described.

(System Configuration)

Figure 1:
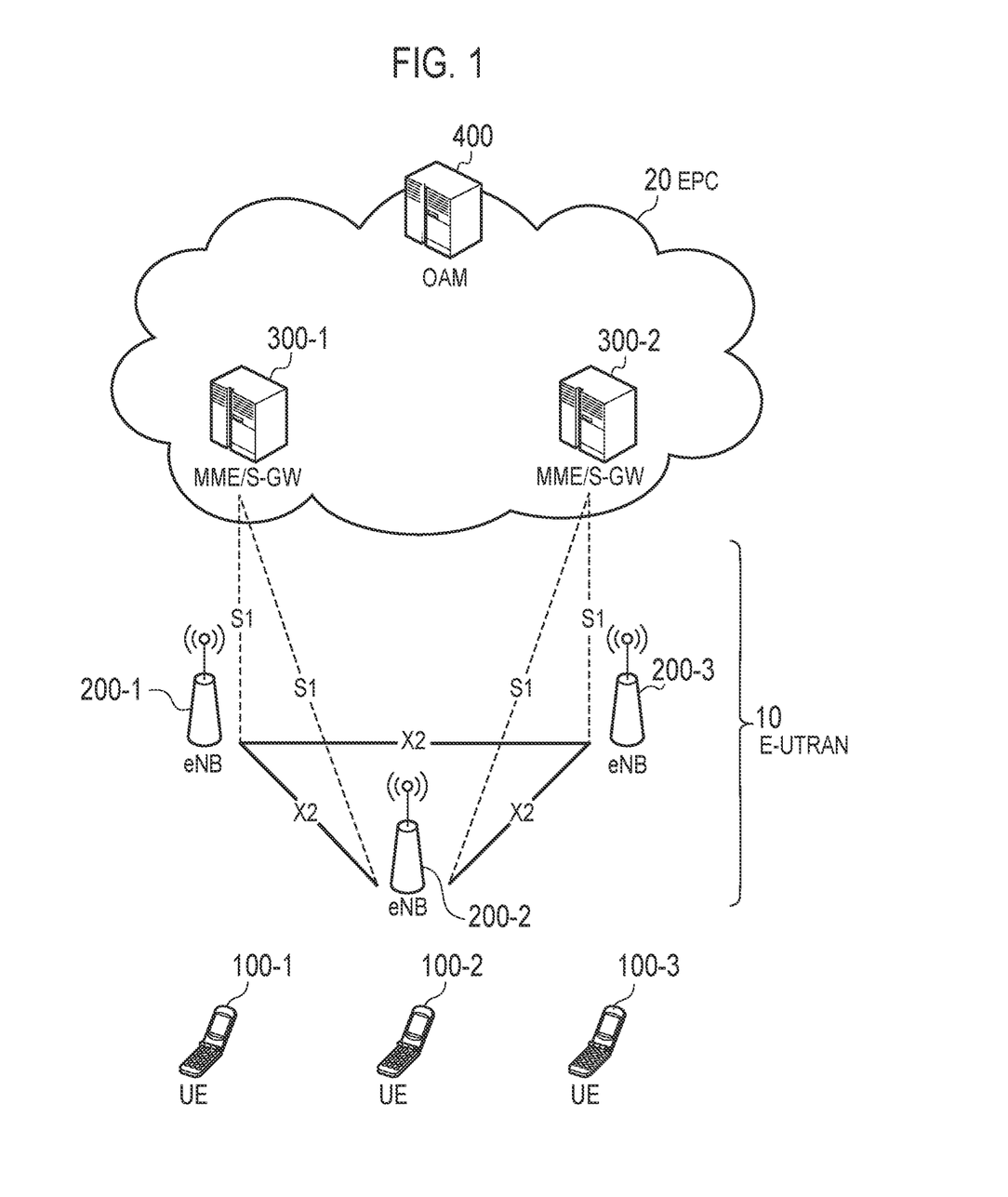
FIG. 1 is a configuration diagram of an LTE system.

First, system configuration of the LTE system will be described. FIG. 1 is a configuration diagram of an LTE system. As illustrated in FIG. 1, the LTE system according to embodiments includes a plurality of UEs (User Equipments) 100, E-UTRAN (Evolved-Universal Terrestrial Radio Access Network) 10, and EPC (Evolved Packet Core) 20.

The UE 100 corresponds to a radio terminal. The UE 100 is a mobile communication device and performs radio communication with a cell (a serving cell) that connected to the radio terminal. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network (LTE network) of the LTE system. The EPC 20 includes a plurality of MME (Mobility Management Entity)/S-GWs (Serving-Gateways) 300 and a OAM (Operation and Maintenance) 400. The MME performs various mobility controls and the like for the UE 100. The S-GW performs control to transfer user data. MME/S-GW 300 is connected to eNB 200 via an S1 interface.

The OAM 400 is a server apparatus managed by an operator, and performs maintenance and monitoring of the E-UTRAN 10.

Figure 2:
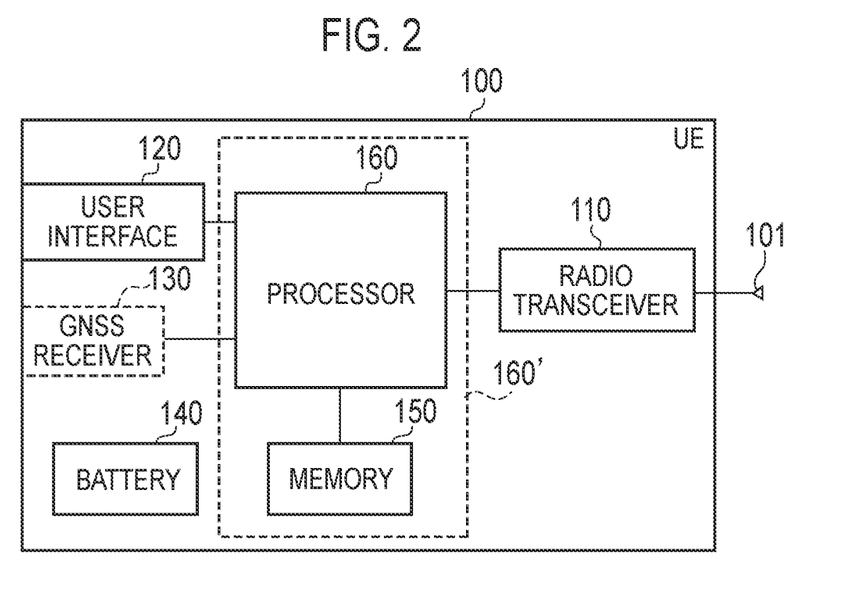
FIG. 2 is a block diagram of a UE.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds a memory, the processor 160 corresponds to a controller. The UE 100 may not include the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
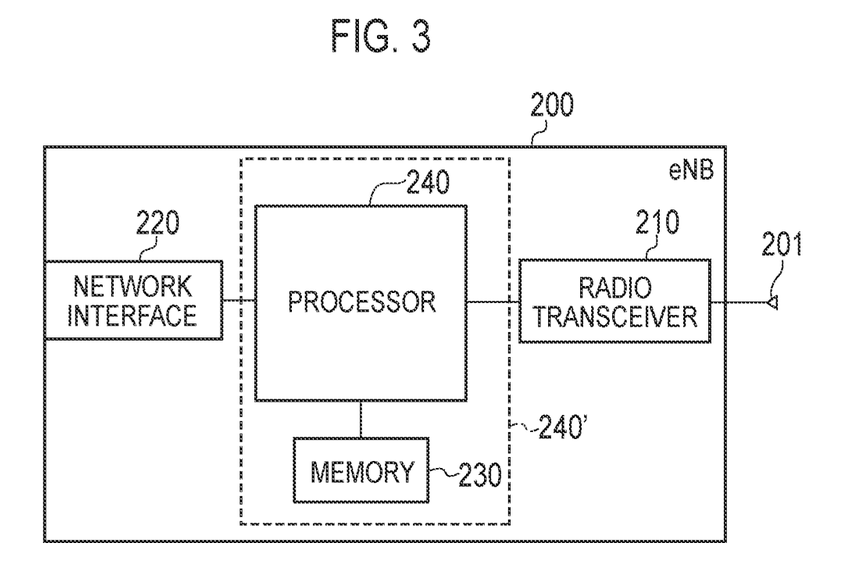
FIG. 3 is a block diagram of an eNB.

FIG. 3 is a block diagram of the eNB 200. As illustrated in FIG. 3, the eNB 200 includes plural antennas 201, a radio transceiver 210, a network interface 220, a memory 230, and a processor 240. Furthermore, the memory 230 may be integrally formed with the processor 240, and this set (that is, a chip set) may be called a processor 240'.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
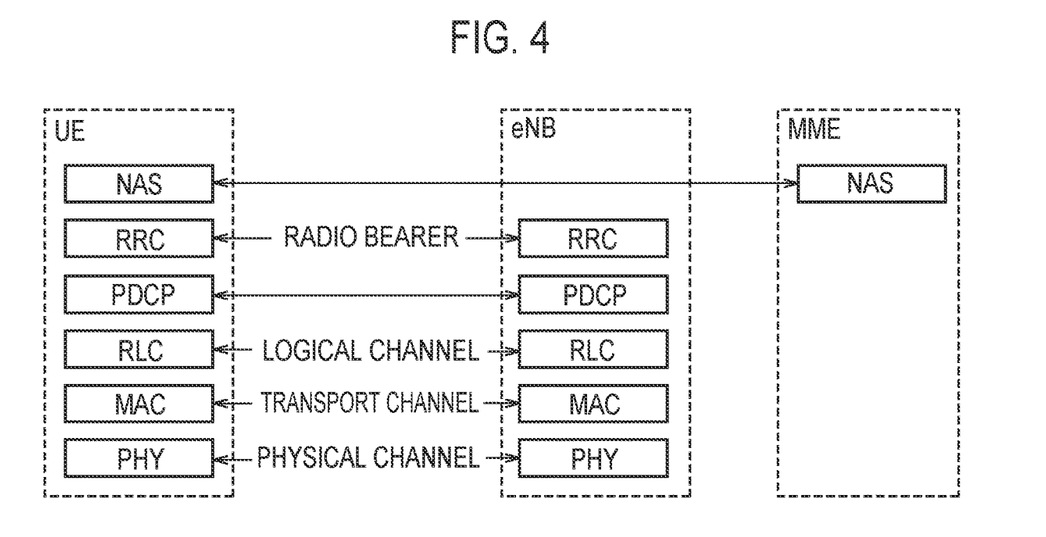
FIG. 4 is a protocol stack diagram.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines (schedules) a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control signal (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode (connected mode), otherwise the UE 100 is in an RRC idle mode (idle mode).

A NAS (Non-Access Stratum) layer positioned above the RRC layer performs a session management, a mobility management and the like.

Figure 5:
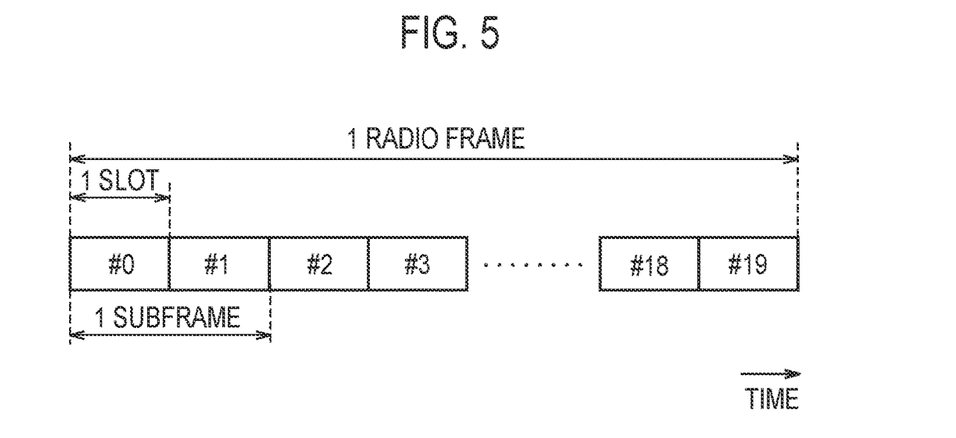
FIG. 5 is a configuration diagram of a radio frame.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element (RE). Of the radio resources (time and frequency resources) assigned to the UE 100, a frequency resource can be constituted by a resource block and a time resource can be constituted by a subframe (or a slot).

(Overview of DRX Operation)

A discontinuous reception (DRX) operation in the RRC idle mode will be described, below.

The UE 100 can perform the DRX operation to conserve a battery. The UE 100 performing the DRX operation discontinuously monitors a PDCCH. Normally, a PDCCH in a subframe carries scheduling information (information on a radio resource and a transport format) of the PDSCH in the subframe.

The UE 100 in the RRC idle mode performs a DRX operation for discontinuously monitoring the PDCCH to receive a paging message notifying that there is an incoming call. The UE 100 uses a group identifier for paging (P-RNTI) to decode the PDCCH (CCE) and obtain assignment information of a paging channel (PI). The UE 100 obtains the paging message, based on the assignment information. A PDCCH monitoring timing in the UE 100 is normally determined based on an identifier (International Mobile Subscriber Identity (IMSI)) of the UE 100. A calculation of the PDCCH monitoring timing will be specifically described.

The PDCCH monitoring timing in the DRX operation in the RRC idle mode (PDCCH monitoring subframe) is referred to as Paging Occasion (PO).

The UE 100 (and the eNB 200) calculates the Paging Occasion (PO) and a Paging Frame (PF) which is a radio frame that may include the Paging Occasion, as follows.

A system frame number (SFN) of the PF is evaluated from the following formula (1).

$$\text{SFN mod } T = (T \text{ div } N) * (\text{UE\_ID mod } N) \quad (1)$$

Here, T is a DRX cycle of the UE 100 for receiving the paging message, and is represented by the number of radio frames. N is a minimum value out of T and nB. nB is a value selected from 4T, 2T, T, T/2, T/4, T/8, T/16, and T/32. UE_ID is a value evaluated by "IMSI mod 1024".

Of the PFs evaluated in this manner, a subframe number of the PO is evaluated as follows. First, index i_s is evaluated by the following formula (2).

$$i\_s = \text{floor}(\text{UE\_ID}/N) \text{mod } Ns \quad (2)$$

Here, Ns is a maximum value out of 1 and nB/T.

Next, Ns and the PO corresponding to the index i_s are evaluated from Table 1 or Table 2. Table 1 is applied to an LTE FDD system, and Table 2 is applied to an LTE TDD system. In Table 1 and Table 2, N/A represents not applicable.

TABLE 1

| Ns | PO when i_s=0 | PO when i_s=1 | PO when i_s=2 | PO when i_s=3 |
|----|---------------|---------------|---------------|---------------|
| 1  | 9             | N/A           | N/A           | N/A           |
| 2  | 4             | 9             | N/A           | N/A           |
| 4  | 0             | 4             | 5             | 9             |

TABLE 2

| Ns | PO when i_s=0 | PO when i_s=1 | PO when i_s=2 | PO when i_s=3 |
|----|---------------|---------------|---------------|---------------|
| 1  | 0             | N/A           | N/A           | N/A           |
| 2  | 0             | 5             | N/A           | N/A           |
| 4  | 0             | 1             | 5             | 6             |

By the above-described means, the UE 100 and the eNB 200 determine a timing at which the paging message may be transmitted.

Next, the extended DRX will be described. By the extended DRX, it is possible to configure an extended DRX cycle longer than a conventional DRX cycle in the idle mode. In the present embodiment, the extended DRX operation is executed in the idle mode.

The extended DRX may be prescribed by an expansion of the value range of a paging cycle (defaultPagingCycle) within an existing PCCH configuration (PCCH-Config.) broadcasted to the UE 100 by a SIB2.

Alternatively, the extended DRX may be prescribed as an information element different from the existing "DRX-Config". For example, configuration information of the extended DRX in the idle mode, "Idle-eDRX-Config", may be prescribed. For the "Idle-eDRX-Config", it may be possible to set, as the extended DRX cycle, a value range such as " . . . , rf512, rf1024, . . . ".

Operation According to First Embodiment

Figure 6:
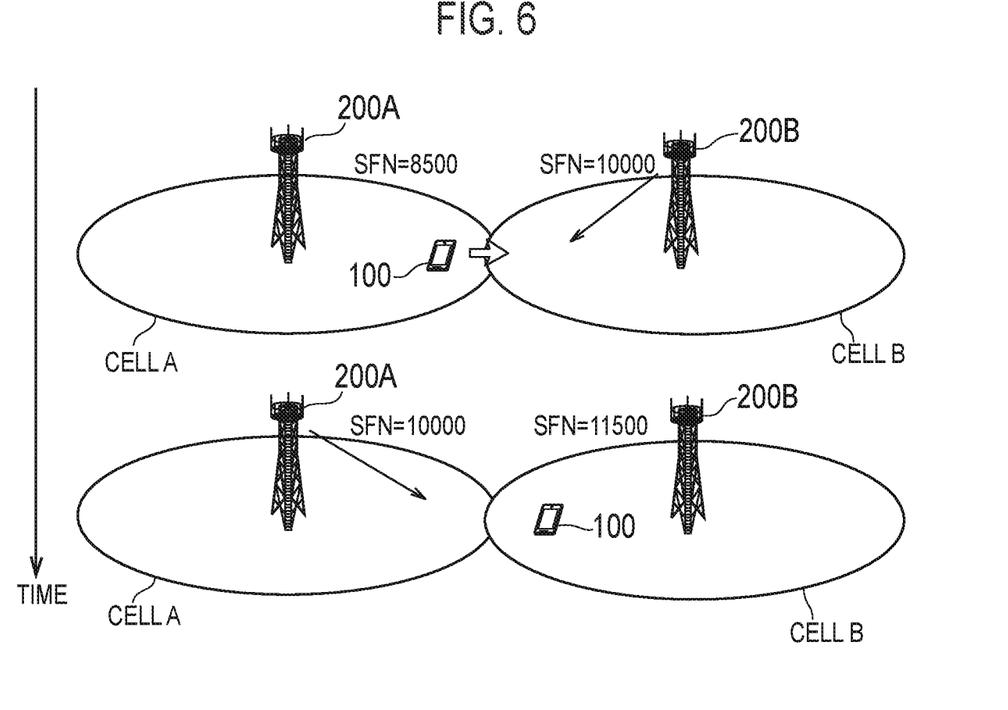
FIG. 6 is a diagram for describing an operation according to a first embodiment.
Figure 7:
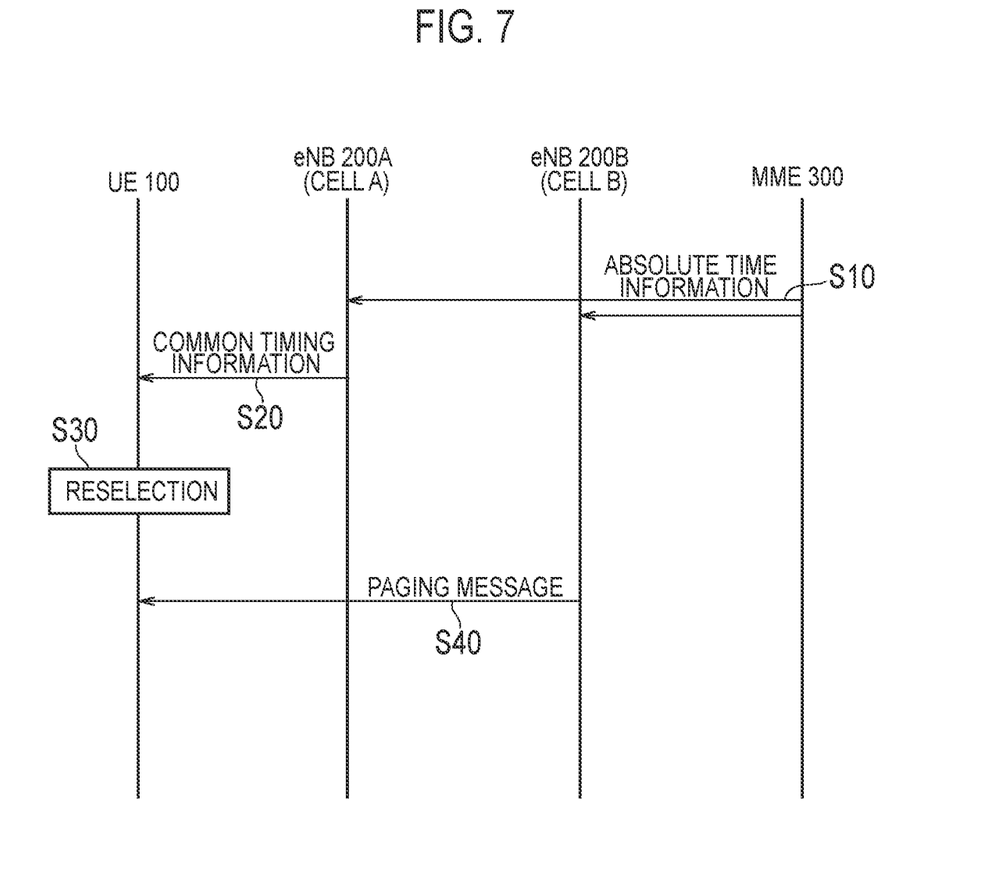
FIG. 7 is a sequence diagram for describing the operation according to the first embodiment.

Next, an operation according to the first embodiment will be described with reference to FIG. 6 and FIG. 7. FIG. 6 is a diagram for describing the operation according to the first embodiment. FIG. 7 is a sequence diagram for describing the operation according to the first embodiment. It is noted that hereinafter, sometimes, an operation of an eNB 200A will be described as an operation of a Cell A and an operation of an eNB 200B will be described as an operation of a Cell B.

As illustrated in FIG. 6, the eNB 200A manages the Cell A, and the eNB 200B manages the Cell B adjacent to the Cell A. The Cell A and the Cell B belong to the same tracking area (TA).

Each time the SFN becomes 10000, 20000, . . . , each of the eNB 200A (Cell A) and the eNB 200B (Cell B) transmits the PDCCH for the UE 100 to receive the paging message. It is noted that the maximum value of an existing SFN is 1023, and thus, it is assumed that the SFN has extended. Furthermore, the SFN of the eNB 200A and the SFN of the eNB 200B are different. As illustrated in FIG. 6 (upper part of the diagram), if the SFN of the eNB 200A is 8500, the SFN of the eNB 200B is 10000. Therefore, the transmission timing of the PDCCH is different between the eNB 200A and the eNB 200B.

The UE 100 exists in the Cell A. The UE 100 is in the RRC idle mode. The extended DRX in the RRC idle mode is configured to the UE 100. Description proceeds on the assumption that the extended DRX cycle is 4320000 [SFN] (12 hours), and that the first PDCCH monitoring timing of the UE 100 is a timing at which the SFN of the eNB 200A is 10000. It is noted that the next PDCCH monitoring timing is a timing at which the SFN of the eNB 200A corresponds to 4330000.

As illustrated in FIG. 6 (upper part of the diagram), while the UE 100 executing the extended DRX operation exists in the Cell A, the SFN reaches 10000 in the eNB 200B and the PDCCH is transmitted. Meanwhile, the SFN is 8500 in the eNB 200A (Cell A), and thus, the transmission timing of the PDCCH has not been reached.

Thereafter, the UE 100 is assumed to move toward the Cell B. Along with the movement, the UE 100 executes a cell reselection procedure. Specifically, the UE 100 performs a cell search and (re)selects a predetermined cell (for example, a cell with the highest reception level) among the discovered cells. The UE 100 selects the Cell B to exist in the Cell B.

Here, as illustrated in FIG. 6 (lower part of the diagram), if the SFN reaches 10000 in the eNB 200A, the timing at which the SFN of the eNB 200A is 10000 becomes the first PDCCH monitoring timing of the UE 100, and thus, the UE 100 monitors the PDCCH. The eNB 200A transmits the PDCCH, but the eNB 200B does not transmit the PDCCH, and thus, the UE 100 misses an occasion for monitoring the PDCCH. The next PDCCH monitoring timing of the UE 100 is a timing at which the SFN of the eNB 200B corresponds to 4331500. Therefore, the UE 100 does not perform monitoring until the next PDCCH monitoring timing, and thus, it is likely that an occasion for obtaining a paging message is delayed by the time of the extended DRX cycle. Furthermore, if each eNB 200 transmits the paging message only once, it is also likely that the UE 100 cannot obtain the paging message.

Here, the method described below offers a solution to the problem described above.

As illustrated in FIG. 7, in step S10, the MME 300 notifies each eNB 200 (the eNB 200A and the eNB 200B) managing each cell belonging to the same tracking area, of absolute time information.

The absolute time information is information indicating the time (absolute time) at which each cell belonging to the same tracking area (each eNB 200 managing the each cell) simultaneously transmits the PDCCH. For example, the MME 300 may notify each eNB 200 of the current subframe number or system frame number as absolute time. Furthermore, the MME 300 may notify each eNB 200 of information indicating a starting point of the absolute time. For example, the MME 300 may designate a subframe through which the absolute time information is transmitted, as absolute subframe number "0". Each eNB 200 interprets the subframe through which the absolute time information is transmitted, as absolute subframe number "0". Each eNB 200 simultaneously transmits the PDCCH at a common timing (SFN) determined by the absolute time. It is noted that the common timing may be in units of radio frames (PF) or in units of subframes (PO).

Each eNB 200 that has received the absolute time information calculates to what number of SFN in the eNB 200 the absolute time corresponds. Hereinafter, description proceeds on the assumption that the absolute time corresponds to a SFN of 10000 in the eNB 200A and to a SFN of 11500 in the eNB 200B.

In step S20, the eNB 200A (Cell A) transmits common timing information to the UE 100. The UE 100 receives the common timing information from the eNB 200A (Cell A). The common timing information may be transmitted by broadcast by a common signal (SIB, PDCCH, for example), or may be transmitted by unicast by an individual signal (PDSCH, for example).

The common timing information is information on a SFN corresponding to the common timing (absolute time). For example, the common timing information is a parameter for calculating a SFN (or a subframe within the SFN) corresponding to the absolute time. In the present embodiment, the common timing information is information indicating a SFN corresponding to the absolute time calculated in step S10. Therefore, the UE 100 determines, based on the common timing information, the timing at which the SFN is 10000 in the eNB 200A to be the common timing (absolute time). Thereafter, the UE 100 moves toward the Cell B.

In step S30, the UE 100 executes a cell reselection procedure. The UE 100 selects the Cell B to exist in the Cell B.

In step S40, the eNB 200A and the eNB 200B simultaneously transmit the PDCCH at the common timing (absolute time). Meanwhile, the UE 100 monitors, based on the common timing information, the PDCCH at the common timing. Therefore, the UE 100 monitors the PDCCH even if the common timing is not a PDCCH monitoring timing based on the extended DRX configuration. As a result, the UE 100 can monitor the PDCCH even without waiting for the next PDCCH monitoring timing, and thus, the UE 100 can obtain a paging message addressed to the UE 100.

It is noted that, if the extended DRX operation is executed, the UE 100 may monitor the PDCCH at the common timing. That is, the UE 100 executing a normal DRX operation in the idle mode may or may not monitor the PDCCH at the common timing.

Second Embodiment

Next, a second embodiment will be described. In the second embodiment, the UE 100 starts, under a predetermined condition, a procedure for obtaining information indicated by the paging message.

Operation examples 1 to 3 according to the second embodiment will be described, below.

(1) Operation Example 1

First, the operation example 1 will be described.

The UE 100 obtains, from the eNB 200 or the MME 300, configuration information for configuring the extended DRX. The UE 100 determines, based on the configuration information, whether or not the extended DRX cycle exceeds a threshold value. The threshold value is a value for which a problem is less likely to occur even if there is no occasion for obtaining a paging message during the length of at least two cycles of the extended DRX cycle, for example. The threshold value is, for example, the length of up to two cycles of the conventional DRX cycle. Alternatively, the threshold value is a value at which power saving effect at the time when the UE 100 executes the extended DRX operation becomes higher than power saving effect at the time when a power supply is stopped to any part other than a function necessary for the UE 100 to be activated.

If the extended DRX cycle does not exceed the threshold value, the UE 100 performs, based on the configuration information, configuration of the extended DRX. Thereafter, the UE 100 in the idle mode executes the extended DRX operation. The extended DRX cycle does not exceed the threshold value, and thus, the UE 100 can reduce a probability of not being able to obtain a paging message over a long period during which a problem may occur.

Meanwhile, if the extended DRX cycle (for example, 4320000 [SFN]) exceeds the threshold value, the UE 100 stops the power supply to any part other than a function necessary for the UE 100 to be activated. For example, the UE 100 stops the power supply to at least one of: the radio transceiver 110, the user interface 120, and the GNSS receiver 130. The UE 100 may perform a process for partly deactivating a function of the processor 160. If a below-described activation timer expires, the UE 100 may turn off the power supply to any part other than a function necessary for the UE 100 to be activated.

After performing the process described above, the UE 100 activates an activation timer shorter than the extended DRX cycle. Thereafter, upon expiration of the activation timer, the UE 100 resumes the power supply and starts an operation for obtaining the paging message. Specifically, after executing a random access procedure, the UE 100 performs registration (attachment) to a network. Thus, the network comprehends the location (tracking area) of the UE 100. If a paging message addressed to the UE 100 exists, the network notifies (pages) the UE 100 of the paging message. Thus, the UE 100 can obtain the paging message even when the paging message cannot be obtained as a result of the cell reselection procedure. Therefore, it is possible to reduce the possibility that the paging message cannot be obtained for a long period as a result of the cell reselection procedure.

It is noted that the expiration of the activation timer corresponds to "a predetermined condition being satisfied".

(2) Operation Example 2

Next, the operation example 2 will be described. Compared to the operation example 1, an operation of the UE 100 after resuming the power supply is different in the operation example 2.

Upon expiration of the activation timer, the UE 100 resumes the power supply. Thereafter, the UE 100 starts an operation for obtaining the paging message, if a cell in which to exist before the power supply is stopped is different from a cell in which to exist after the power supply is resumed.

For example, upon performing a cell search, if selecting a cell (Cell B) different from the cell (Cell A) in which to exist before the power supply is stopped, the UE 100 starts the operation for obtaining the paging message. Meanwhile, if selecting the same cell (Cell A) as the cell (Cell A) in which to exist before the power supply is stopped, the UE 100 does not perform the operation for obtaining the paging message, but executes the extended DRX operation. Alternatively, even if the activation timer has expired, if time is left until the PDCCH monitoring timing, the UE 100 may stop again the power supply and may newly activate the activation timer.

Thus, if there is a possibility for having missed an occasion for obtaining the paging message, the UE 100 starts the operation for obtaining the paging message. Therefore, it is possible to reduce the possibility that the paging message cannot be obtained for a long period as a result of the cell reselection procedure.

(3) Operation Example 3

Next, the operation example 3 will be described. In the operation example 3, the UE 100 does not stop the power supply.

Even if the extended DRX cycle exceeds the threshold value, the UE 100 does not stop the power supply and may execute the extended DRX operation. In this case, the UE 100 activates the activation timer. Upon expiration of the activation timer, the UE 100 starts the operation for obtaining the paging message. Thus, the UE 100 can independently obtain the paging message even when the paging message cannot be obtained as a result of the cell reselection procedure.

Alternatively, if the UE 100 does not activate the activation timer and executes the cell reselection procedure, the UE 100 may start the operation for obtaining the paging message. Thus, the UE 100 can independently obtain the paging message even when the paging message cannot be obtained as a result of the cell reselection procedure.

Third Embodiment

Next, a third embodiment will be described. In the third embodiment, a paging message addressed to the UE 100 configured with the extended DRX, is retransmitted.

Upon reception of the paging message from the MME 300, which is an upper node, the eNB 200 determines whether the extended DRX is configured to the UE 100 to which the paging message is addressed. For example, if configuration information for configuring the extended DRX cycle has been transmitted to the UE 100 by individual signaling (for example, an RRC message), the eNB 200 determines that the extended DRX cycle is configured to the UE 100.

Alternatively, the eNB 200 may inquire the MME 300 about whether or not the extended DRX cycle is configured to the UE 100. If having transmitted to the UE 100, by NAS signaling (NAS message), the configuration information for configuring the extended DRX cycle, the MME 300 notifies this matter in a response to the eNB 200. Alternatively, if having notified by the UE 100, by NAS signaling, that the extended DRX has been configured, the MME 300 notifies this matter in a response to the eNB 200.

Alternatively, upon reception of a paging message from an upper node, the MME 300 may determine whether the extended DRX cycle is configured to the UE 100 to which the paging message is addressed. Upon notifying the paging message to each eNB 200, the MME 300 may notify information indicating whether or not the extended DRX cycle is configured to the UE 100 as well as the paging message. It is noted that, as described above, the MME 300 can determine whether or not the extended DRX cycle is configured to the UE 100. Based on the information, the eNB 200 determines whether or not the extended DRX cycle is configured to the UE 100.

The eNB 200 that has received the paging message does not retransmit the paging message addressed to a UE 100 to which the extended DRX is not configured (the normal DRX being configured), but executes a normal operation for transmitting the paging message. Meanwhile, the eNB 200 retransmits the paging message addressed to the UE 100 to which the extended DRX is configured. For example, after transmitting the paging message, the eNB 200 retransmits the paging message at the next timing for transmitting the paging message.

Alternatively, the eNB 200 may continue to retransmit the paging message and terminate the retransmission of the paging message if detecting that the UE 100 has obtained the paging message. For example, upon receiving a signaling from the UE 100, the eNB 200 may detect that the UE 100 has obtained the paging message. Alternatively, upon receiving, from the MME 300 or from another eNB 200, a notification with an indication that the UE 100 has obtained the paging message, the eNB 200 may detect that the UE 100 has obtained the paging message.

Therefore, the occasions for the UE 100 to obtain the paging message increase, and thus, it is possible to reduce the possibility of long time intervals during which the paging message addressed to the UE 100 cannot be obtained.

It is noted that, if the UE 100 to which the paging message is addressed, is an MTC, the eNB 200 may retransmit the paging message, in addition to the configuration of the extended DRX. A notification whether or not the UE 100 is an MTC may be notified from an upper node (the MME 300, for example).

Fourth Embodiment

Next, a fourth embodiment will be described. In the fourth embodiment, upon selecting a new cell by the cell reselection procedure, the UE 100 performs reconfiguration of the extended DRX.

First, the UE 100 in the idle mode existing in a predetermined cell executes a cell reselection procedure and, upon selecting a new cell, establishes an RRC connection with the new cell (with the eNB 200 managing the new cell). Thus, the UE 100 transitions from the idle mode to the connected mode. The UE 100 obtains (receives), from the new cell (the eNB 200), configuration information for configuring the extended DRX (hereinafter, referred to as configuration information). The UE 100 performs configuration of the extended DRX, based on the configuration information obtained from the new cell.

It is noted that, after starting the cell reselection procedure, the UE 100 may discard the configuration information obtained from the predetermined cell (the cell in which to exist before the new cell is selected). Specifically, the UE 100 can discard the configuration information obtained from the predetermined cell if at least one of the following applies: (a) the new cell has been selected; (b) the configuration information has been obtained from the new cell (the eNB 200); (c) configuration of the extended DRX has been performed based on the configuration information obtained from the new cell.

Thereafter, the UE 100 transitions to the idle mode and executes the extended DRX operation. The UE 100 executes the extended DRX operation in accordance with the configuration of the new cell, and thus, it is possible to reduce the possibility of long time intervals during which the paging message cannot be obtained.

OTHER EMBODIMENTS

In the above-described first embodiment, the common timing information is information indicating the SFN corresponding to the absolute time calculated by the eNB 200; however, this is not limiting. The eNB 200 may transmit, to the UE 100, a calculation parameter for calculating the SFN corresponding to the absolute time. For example, the UE 100 receives the absolute time information from the MME 300 by a NAS message. Furthermore, the UE 100 receives, from the eNB 200 managing the cell in which to exist, the calculation parameter as common timing information. Based on the absolute time and the calculation parameter, the UE 100 may calculate the SFN corresponding to the absolute time.

In the above-described first embodiment, a network device (network node) other than the MME 300 may execute a similar operation to that of the MME 300. For example, an MBMS GW or an MCE (Multi-Cell Multicast Coordination Entity) may execute the operation of the MME 300 according to the first embodiment. It is noted that the MBMS GW is an upper node of the eNB 200, and the MCE is an upper node of the eNB 200 and a lower node of the MME 300.

It is noted that the MME 300 includes a network interface, a memory, and a processor. It is noted that the memory may be integrated with the processor, and this set (that is, a chipset) may be used as a processor. The network interface is connected to the eNB 200 via the S1 interface. The network interface is used for communication performed over the S1 interface. The memory stores a program executed by the processor, and information used for a process by the processor. The processor includes a baseband processor that performs modulation and demodulation, encoding and decoding, and the like on a baseband signal, and a CPU that performs various types of processes by executing the program stored in the memory. A processor 340 executes various types of processes and various types of communication protocols described above. It is noted that the MBMS GW and the MCE can also have a similar configuration to that of the MME 300.

In each of the above-described embodiments, the UE 100 periodically executes a measurement of a radio condition to determine whether or not to execute the cell reselection procedure. In order to execute the cell reselection procedure at an appropriate timing, the measurement cycle for the radio condition (in the idle mode) may be decided in accordance with the extended DRX cycle (and the DRX cycle). For example, the network device (the eNB 200, the MME 300, or the like) may notify the UE 100 of a value calculated in accordance with the extended DRX cycle (and the DRX cycle) as the measurement cycle for the radio condition. Alternatively, the UE 100 may calculate the measurement cycle in accordance with the extended DRX cycle (and the DRX cycle). The UE 100 can execute the measurement of the radio condition according to the measurement cycle notified from the network device or the measurement cycle calculated by the UE 100.

The operation of the node (the UE 100, the eNB 200, the MME 300) in each of the above-described embodiments may be combined and executed where appropriate.

In the above-described embodiment, as one example of a cellular communication system, the LTE system is described; however, the present disclosure is not limited to the LTE system, and the present disclosure may be applied to systems other than the LTE system.

INDUSTRIAL APPLICABILITY

The present disclosure is useful in the field of communication.

The invention claimed is:

1. A base station, comprising:
  a receiver configured to receive, from a Mobility Management Entity (MME), a notification of a paging message addressed to a radio terminal, the notification indicates whether an extended DRX is configured in the radio terminal, and the extended DRX uses a second DRX cycle longer than a first DRX cycle,
  a transmitter configured to transmit the paging message; and
  a controller configured to retransmit the paging message when the notification received from the MME indicates that the extended DRX is configured in the radio terminal, which is configured to determine a time period for a measurement of radio condition for determining whether or not to execute a cell reselection procedure in an idle mode based on a length of the second DRX cycle used by the extended DRX, and perform, in the idle mode, the measurement of radio condition based on the determined time period.

2. The base station according to claim 1, wherein
  the controller is further configured to determine, if receiving the paging message from an upper node, whether or not the extended DRX is configured to the radio terminal to which the paging message is addressed.

3. The base station according to claim 1, wherein
  the receiver is further configured to receive, from an upper node, information indicating whether or not the extended DRX is configured to a radio terminal to which the paging message is addressed, together with the paging message.

4. An apparatus provided in a base station, comprising:
  a processor and a memory communicatively coupled to the processor, the processor configured to execute the processes of:
  receiving, from a Mobility Management Entity (MME), a notification of a paging message addressed to a radio terminal, the notification indicates whether an extended DRX is configured in the radio terminal, and the extended DRX uses a second DRX cycle longer than a first DRX cycle;
  transmitting the paging message; and
  retransmitting the paging message when the notification received from the MME indicates that the extended DRX is configured in the radio terminal, which is configured to determine a time period for a measurement of radio condition for determining whether or not to execute a cell reselection procedure in an idle mode based on a length of the second DRX cycle used by the extended DRX, and perform, in the idle mode, the measurement of radio condition based on the determined time period.

5. A communication method, comprising:
  receiving from a Mobility Management Entity (MME) by a base station, a notification of a paging message addressed to a radio terminal, the notification indicates whether an extended DRX is configured in the radio terminal, and the extended DRX uses a second DRX cycle longer than a first DRX cycle;

transmitting, by the base station, the paging message;
retransmitting, by the base station, the paging message when the notification received from the MME indicates that the extended DRX is configured in the radio terminal;
determining, by the radio terminal, a time period for a measurement of radio condition, based on a length of the second DRX cycle used by the extended DRX, the measurement being performed for determining whether or not to execute a cell reselection procedure in an idle mode; and
performing, by the radio terminal, in the idle mode, the measurement of radio condition based on the determined time period.

\* \* \* \* \*